(12) United States Patent
Peterson (10) Patent No.: US 9,080,601 B1
(45) Date of Patent: Jul. 14, 2015

(54) FLOW ENHANCING BEARING ASSEMBLIES, APPARATUSES, AND MOTOR ASSEMBLIES USING THE SAME

(75) Inventor: S. Barrett Peterson, Orem, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 13/550,821

(22) Filed: Jul. 17, 2012

Related U.S. Application Data

(60) Provisional application No. 61/525,443, filed on Aug. 19, 2011.

(51) Int. Cl.
| F16C 17/02 | (2006.01) |
| F16C 17/04 | (2006.01) |
| F16C 33/10 | (2006.01) |
| F16N 1/00 | (2006.01) |
| F16C 17/24 | (2006.01) |

(52) U.S. Cl.
CPC ............... *F16C 17/028* (2013.01); *F16C 17/02* (2013.01); *F16C 17/04* (2013.01); *F16C 17/047* (2013.01); *F16C 17/243* (2013.01); *F16C 33/108* (2013.01)

(58) Field of Classification Search
CPC ........ F16C 17/00; F16C 17/02; F16C 17/024; F16C 17/026; F16C 17/028; F16C 17/04; F16C 17/042; F16C 17/047; F16C 17/12; F16C 17/14; F16C 17/243; F16C 33/108; E21B 10/22
USPC ........... 384/92, 93, 95, 97, 98, 322, 368, 303, 384/304, 420; 175/372
See application file for complete search history.

(56) References Cited

U.S. PATENT DOCUMENTS

| 4,789,251 A * | 12/1988 | McPherson et al. .......... 384/317 |
| 5,253,939 A | 10/1993 | Hall |
| 5,482,380 A | 1/1996 | Corratti et al. |
| 5,498,081 A * | 3/1996 | Dennis et al. ................... 384/95 |
| 5,879,085 A | 3/1999 | Ball et al. |
| 6,132,094 A | 10/2000 | Cornelison et al. |
| 7,255,480 B2 * | 8/2007 | John et al. ...................... 384/303 |
| 7,552,782 B1 | 6/2009 | Sexton et al. |
| 7,866,418 B2 | 1/2011 | Bertagnolli et al. |
| 7,998,573 B2 | 8/2011 | Qian et al. |

(Continued)

FOREIGN PATENT DOCUMENTS

WO   WO 2009015338 A2 *   1/2009   ............... E21B 4/00

OTHER PUBLICATIONS

U.S. Appl. No. 13/410,514, Aug. 27, 2013, Notice of Allowance.

(Continued)

*Primary Examiner* — Alan B Waits
*Assistant Examiner* — Brian McGovern
(74) *Attorney, Agent, or Firm* — Dorsey & Whitney LLP (57) ABSTRACT

Bearing assemblies, apparatuses, and motor assemblies using the same are disclosed. In an embodiment, a bearing assembly may include a plurality of superhard bearing elements distributed circumferentially about an axis. Each of the superhard bearing elements may have a bearing surface. The bearing assembly may further include a support ring that carries the plurality of superhard bearing elements. A plurality of mixing features may also be distributed circumferentially about the axis. The mixing features may be configured and/or arranged to at least partially influence flow of lubricating fluid onto the bearing surfaces and/or periphery of the plurality of superhard bearing elements.

23 Claims, 7 Drawing Sheets

(56) References Cited

U.S. PATENT DOCUMENTS

| | | | |
|---|---|---|---|
| 8,034,136 | B2 | 10/2011 | Sani |
| 8,480,304 | B1 | 7/2013 | Cooley et al. |
| 2002/0141670 | A1 | 10/2002 | Nicholas |
| 2004/0190804 | A1 | 9/2004 | Hendrik et al. |
| 2009/0097788 | A1* | 4/2009 | Cooley et al. .................. 384/107 |
| 2010/0084196 | A1* | 4/2010 | Bertagnolli et al. ........... 175/428 |
| 2010/0218995 | A1* | 9/2010 | Sexton et al. .................... 175/57 |
| 2012/0039551 | A1* | 2/2012 | Cooley et al. .................... 384/26 |
| 2012/0080230 | A1 | 4/2012 | Flores et al. |

OTHER PUBLICATIONS

U.S. Appl. No. 11/545,929, filed Oct. 10, 2006, Bertagnolli et al.
U.S. Appl. No. 12/761,535, filed Apr. 16, 2010, Scott et al.
U.S. Appl. No. 13/213,382, filed Aug. 19, 2011, Cooley et al.
U.S. Appl. No. 61/525,443, filed Aug. 19, 2011, Peterson et al.
U.S. Appl. No. 13/410,514, filed Mar. 2, 2012, Peterson et al.
U.S. Appl. No. 13/410,514, May 20, 2013, Office Action.
U.S. Appl. No. 13/410,514, Oct. 29, 2013, Notice of Allowance.
U.S. Appl. No. 13/410,514, Feb. 26, 2014, Issue Notification.
U.S. Appl. No. 14/164,696, filed Jan. 27, 2014, Peterson et al.
U.S. Appl. No. 14/509,760, filed Oct. 8, 2014, Peterson et al.
U.S. Appl. No. 14/164,696, Jul. 8, 2014, Notice of Allowance.
U.S. Appl. No. 14/164,696, Oct. 21, 2014, Notice Of Allowance.
U.S. Appl. No. 14/509,760, Nov. 19, 2014, Notice of Allowance.
U.S. Appl. No. 14/509760, mailed Mar. 18, 2015, Notice of Allowance.
U.S. Appl. No. 14/509760, mailed Mar. 25, 2015, Issue Notification.

* cited by examiner

Fig. 6

FLOW ENHANCING BEARING ASSEMBLIES, APPARATUSES, AND MOTOR ASSEMBLIES USING THE SAME

CROSS-REFERENCE TO RELATED APPLICATIONS

This application claims priority to U.S. Provisional Application No. 61/525,443 filed on 19 Aug. 2011, the contents of which are incorporated herein, in their entirety, by this reference.

BACKGROUND

Subterranean drilling systems that employ downhole drilling motors are commonly used for drilling boreholes in the earth for oil and gas exploration and production. A subterranean drilling system typically includes a downhole drilling motor that is operably connected to an output shaft. A pair of thrust-bearing apparatuses also can be operably coupled to the downhole drilling motor. A rotary drill bit configured to engage a subterranean formation and drill a borehole is connected to the output shaft. As the borehole is drilled with the rotary drill bit, pipe sections may be connected to the subterranean drilling system to form a drill string capable of progressively drilling the borehole to a greater depth within the earth.

Each thrust-bearing apparatus includes a stator that does not rotate relative to the motor housing and a rotor that is attached to the output shaft and rotates with the output shaft. The stator and rotor each includes a plurality of bearing elements that may be fabricated from polycrystalline diamond compacts ("PDCs") that provide diamond bearing surfaces that bear against each other during use.

In operation, high-pressure drilling fluid may be circulated through the drill string and power section of the downhole drilling motor, usually prior to the rotary drill bit engaging the bottom of the borehole, to generate torque and rotate the output shaft and the rotary drill bit attached to the output shaft. When the rotary drill bit engages the bottom of the borehole, a thrust load is generated, which is commonly referred to as "on-bottom thrust" that tends to compress and is carried, at least in part, by one of the thrust-bearing apparatuses. Fluid flow through the power section may cause what is commonly referred to as "off-bottom thrust," which is carried, at least in part, by the other thrust-bearing apparatus. The on-bottom and off-bottom thrust carried by the thrust-bearing apparatuses can be extremely large.

The drilling fluid used to generate the torque for rotating the rotary drill bit exits openings formed in the rotary drill bit and returns to the surface, carrying cuttings of the subterranean formation through an annular space between the drilled borehole and the subterranean drilling system. Typically, a portion of the drilling fluid is diverted by the downhole drilling motor to cool and lubricate the bearing elements of the thrust-bearing apparatuses. Insufficient heat removal due to insufficient flow of the drilling fluid between the bearing elements or near the bearing elements or clotting of materials within the drilling fluid may cause significant damage to the thrust-bearing apparatuses.

The operational lifetime of the thrust-bearing apparatuses often can determine the useful life of the subterranean drilling system.

SUMMARY

Various embodiments of the invention relate to bearing assemblies, apparatuses and motor assemblies that include mixing features configured to improve lubrication and reduce wear of the superhard bearing elements during use by influencing flow of lubricating fluids on and/or around the superhard bearing elements. In an embodiment, a bearing assembly may include a plurality of superhard bearing elements distributed circumferentially about an axis. Each of the superhard bearing elements may have a bearing surface. The bearing assembly may further include a support ring that carries the plurality of superhard bearing elements. A plurality of mixing features may also be distributed circumferentially about the axis. The mixing features may be configured and/or arranged to at least partially influence flow of lubricating fluid over the bearing surfaces and/or periphery of the plurality of superhard bearing elements. In an embodiment, at least one of the mixing features may include a substantially crescent shaped body. In another embodiment, at least one of the mixing features may be rotatable relative to the support ring. In yet other embodiments, at least one of the mixing features may include narrow channels, nubs, ridges, friction elements, ridges, notches, or combinations to influence flow of the lubricating fluid.

In an embodiment, a bearing apparatus includes two bearing assemblies. At least one of the two bearing assemblies may be configured as any of the disclosed bearing assembly embodiments that include a support ring having mixing fins including two-dimensional flow surfaces configured to improve lubrication and reduce wear of the superhard bearing elements during use.

Other embodiments include downhole motors for use in drilling systems and subterranean drilling systems that may utilize any of the disclosed bearing apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

DETAILED DESCRIPTION

Figure 1A:
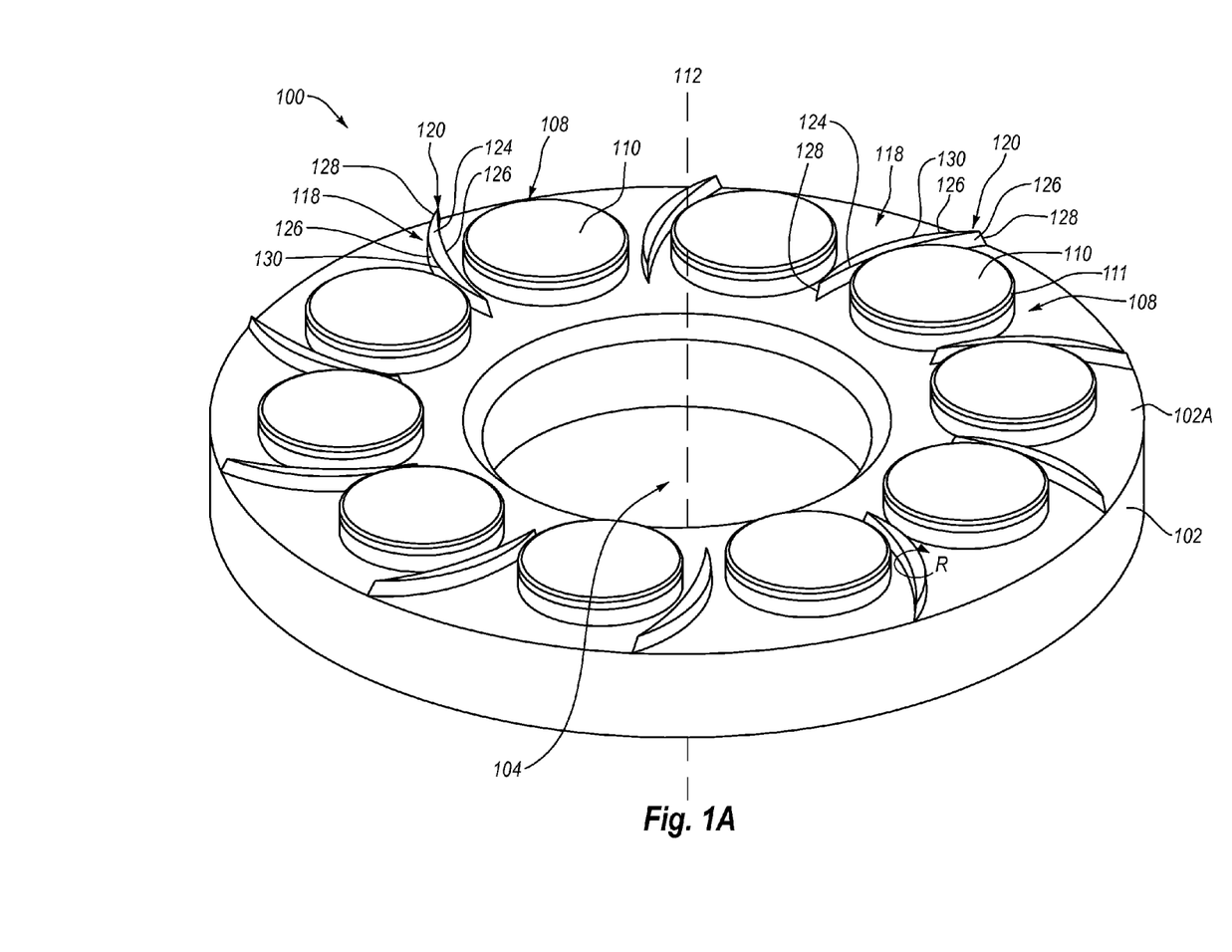
FIG. 1A is an isometric view of a thrust-bearing assembly according to an embodiment.
Figure 1B:
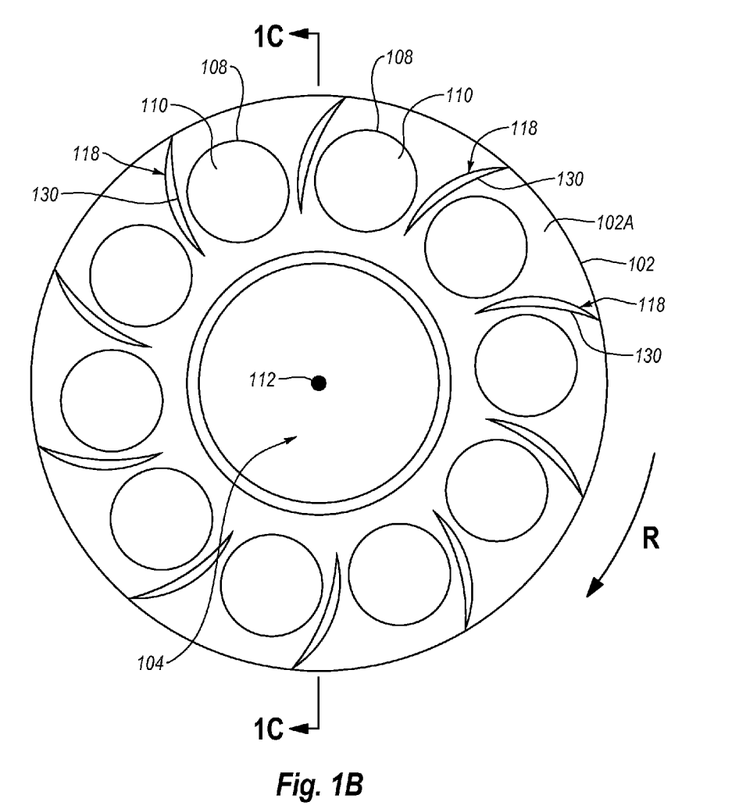
FIG. 1B is a top plan view of the thrust-bearing assembly shown in FIG. 1A.
Figure 1C:
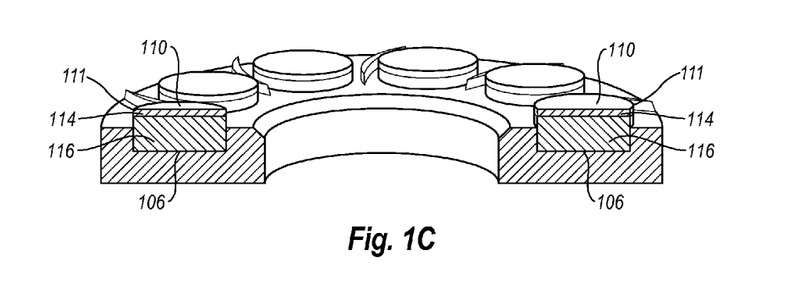
FIG. 1C is an isometric cutaway view taken along line 1C-1C of the thrust-bearing assembly shown in FIG. 1B.

Embodiments of the invention relate to bearing assemblies, apparatuses and motor assemblies that include mixing blades configured to improve lubrication and to reduce wear of superhard bearing elements. FIGS. 1A-1C are isometric, top plan, and isometric cutaway views of a thrust-bearing assembly 100 according to an embodiment. The thrust-bearing assembly 100 may form a stator or a rotor of a thrust-bearing apparatus used in a subterranean drilling system.

In the illustrated embodiment, the support ring 102 is substantially cylindrical and defines an opening 104 through which a shaft (not shown) of, for example, a downhole drilling motor may extend. The support ring 102 may be generally circular and made from a variety of different materials such as carbon steel, stainless steel, tungsten carbide, or another suitable material. The support ring 102 may also include a plurality of recesses 106 (FIG. 1C) formed therein.

The thrust-bearing assembly 100 further may include a plurality of generally cylindrical superhard bearing elements 108 that may include bearing surfaces 110. In other embodiments, the plurality of superhard bearing elements 108 may have a variety of other shapes, including non-cylindrical, oval, triangular, or any other regular or irregular geometric shape. The superhard bearing elements 108 are illustrated in FIG. 1A being distributed circumferentially about a thrust axis 112 along which a thrust force may be generally directed during use. Each superhard bearing element 108 may be partially disposed in a corresponding one of the recesses 106 (FIG. 1C) of the support ring 102 and secured partially therein via brazing, press-fitting, fastening with a fastener, or another suitable technique. As used herein, a superhard bearing element is a bearing element including a bearing surface that is made from a material exhibiting a hardness that is at least as hard as tungsten carbide.

In any of the embodiments disclosed herein, the superhard bearing elements 108 may be made from a number of different superhard materials, such as polycrystalline diamond, polycrystalline cubic boron nitride, silicon carbide, tungsten carbide, or any combination of the foregoing superhard materials. For example, a superhard table 114 (FIG. 1C) may be formed from polycrystalline diamond and a substrate 116 (FIG. 1C) may be formed from cobalt-cemented tungsten carbide. Furthermore, in any of the embodiments disclosed herein, the polycrystalline diamond table may be leached to at least partially or substantially completely remove a metal-solvent catalyst (e.g., cobalt, iron, nickel, or alloys thereof) that was used to sinter precursor diamond particles that form the polycrystalline diamond or re-infiltrate a preformed leached polycrystalline diamond table to a selected depth from a bearing surface. Moreover, in any of the embodiments disclosed herein, the polycrystalline diamond may be unleached and include a metal-solvent catalyst (e.g., cobalt, iron, nickel, or alloys thereof) that was used to sinter the precursor diamond particles that form the polycrystalline diamond or re-infiltrate a preformed leached polycrystalline diamond table. Additionally, in any of the embodiments disclosed herein, the superhard bearing elements 108 may be substrateless and formed from a polycrystalline diamond body that is at least partially or fully leached to remove a metal-solvent catalyst used in the fabrication thereof. Suitable manufacturing techniques for fabricating polycrystalline diamond and polycrystalline diamond compacts that may be used as superhard bearing elements in the disclosed embodiments are disclosed in U.S. Pat. No. 7,866,418 issued on 11 Jan. 2011, the disclosure of which is incorporated herein, in its entirety, by this reference. Additionally, in any of the embodiments disclosed herein, the superhard bearing elements 108 may be substrateless and formed from a polycrystalline diamond body (that may be at least partially leached, substantially fully leached, or un-leached) or other superhard materials. Additionally, in some embodiments, the superhard table 114 may be brazed to the substrate 116 in a high-pressure/high-temperature ("HPHT") process or other non-HPHT process. For example, suitable brazing techniques are disclosed in U.S. application Ser. No. 11/545,929 filed on 10 Oct. 2006, the disclosure of which is incorporated herein, in its entirety, by this reference.

The superhard bearing elements 108 may be pre-machined to tolerances and mounted in the support ring 102 and/or mounted to the support ring 102 and the bearing surfaces 110 thereof and planarized (e.g., by lapping and/or grinding) so that the bearing surfaces 110 are substantially coplanar. Optionally, one or more of the superhard bearing elements 108 may exhibit a peripherally extending edge chamfer 111. However, in other embodiments, the peripherally extending edge chamfer 111 may be omitted.

As illustrated in FIGS. 1A-1C, the thrust-bearing assembly 100 may include mixing features configured to improve lubrication of the thrust-bearing assembly 100. For example, the thrust-bearing assembly 100 may include mixing features configured to direct lubricating fluid over the top and/or around the superhard bearing elements 108 to reduce friction and/or remove heat generated in the superhard bearing elements 108 during operation the thrust-bearing assembly 100.

In an embodiment, as illustrated in FIGS. 1A-1C, the support ring 102 may include a plurality of mixing fins 118 for mixing and/or directing flow of lubricating fluid over the bearing surfaces 110 and/or periphery of the superhard bearing elements 108. Often the lubricating fluid for a thrust-bearing assembly in a subterranean drilling application is referred to as "drilling mud," which is also the fluid used to remove cuttings from the borehole as a drill bit drills a subterranean formation. The mixing fins 118 may be formed in any suitable manner, and no particular method for forming the mixing fins 118 is to be considered limiting. For example, the mixing fins 118 may be formed of carbon steel, stainless steel, tungsten carbide, ceramic materials, Kevlar, engineering plastics, composites, combinations thereof, or other suitably abrasion resistant material. In other embodiments, the mixing fins 118 may be formed integrally on the support ring 102. In other embodiments, the mixing fins 118 may be secured to the support ring 102 via brazing, welding, fastening with a fastener, or another suitable technique. In other embodiments, the mixing fins 118 may be formed as protrusions extending radially from the superhard bearing elements 108. In yet other embodiments, the mixing fins 118 may be secured to the support ring 102 such that the lubricating fluid may flow over, under, through and/or around the mixing fins 118. For example, in one embodiment, the mixing fins 118 may be secured to the support ring 102 via a tether, pivot, pin, or other rotatable mechanism so that the mixing fins 118 may move (within the flow of the lubricating fluid) relative to the support ring 102.

As illustrated, the mixing fins 118 may be circumferentially distributed about the thrust axis 112 with each mixing fin 118 substantially equidistantly positioned between adjacent superhard bearing elements 108. In other embodiments, the mixing fins 118 may be distributed in any configuration suitable to enhance flow of the lubricating fluid. For example, the mixing fins 118 may be distributed about the thrust axis 112, with two or more mixing fins 118 positioned between adjacent superhard bearing elements 108, with one or more mixing fins 118 between every other pair of adjacent superhard bearing elements 108, or in a variety of other configurations. In other embodiments, the mixing fins 118 may be secured to the support ring 102 in a plurality of radially distributed layers. By having the mixing fins 118 positioned on the support ring 102, the mixing fins 118 may mix and/or direct the lubricating fluid flowing between the superhard bearing elements 108 upward onto the bearing surfaces 110 and/or about the periphery of the superhard bearing elements 108. As discussed in more detail herein, the mixing fins 118 may be configured to direct lubricating fluid over the bearing surfaces 110 and a periphery of the superhard bearing elements 108 which, in turn, may dissipate heat generated by friction between the bearing surfaces 110 and opposing bearing surfaces to protect the superhard bearing elements 108 from wear and damage. In addition, the mixing fins 118 may mix the lubricating fluid to help break-up solids having the potential to clog the flow of the lubricating fluid through the thrust-bearing assembly 100.

According to an embodiment, the mixing fins 118 may exhibit any of a variety of different shapes and configurations. As best illustrated in FIGS. 1A and 1B, the mixing fins 118 may have a substantially crescent shaped body 120, defined by a lower surface (not shown), an upper surface 124 substantially parallel with and opposite to the lower surface, and lateral surfaces 126 on opposite sides of the body 120. The lateral surfaces 126 may be substantially arcuate and substantially perpendicular to the upper surface 124 and the lower surface, respectively. The lateral surfaces 126 may converge to form substantially pointed end portions 128 on the body 120. In an embodiment, the end portions 128 and/or the peripheral edges 130 may be configured to cut through and/or agitate the lubricating fluid. The lower surface and the upper surface 124 may converge with the lateral surfaces 126 to form peripheral edges 130 on the upper and lower portions of the body 120. In other embodiments, the mixing fins 118 may have rectangular, square, triangular, trapezoidal, diamond, blade-like, brim-like, or other regular and irregular geometric shapes.

In the illustrated embodiment, the upper surface 124 and/or the lateral surfaces 126 of the mixing fin 118 may be adapted to direct the flow of the lubricating fluid. For example, a portion of the upper surface 124 and/or lateral surfaces 126 may include a two-dimensional curve configured to direct the lubricating fluid onto the bearing surfaces 110. In other embodiments, the upper surface 124 and/or the lateral surfaces 126 may include portions that are rounded, flat, curved, sinusoidal, twisted, combinations thereof, or the like. The upper surface 124 and/or the lateral surfaces 126 may also include narrow elongated channels, nubs, friction elements, ridges, notches, or other features configured to influence fluid flow. For example, ridges formed in the upper surface 124 may influence the flow of the lubricating fluid by altering flow velocities.

In other embodiments, the end portions 128 and/or the peripheral edges 130 may be rounded, flat, curved, or have any other suitable configuration. In some embodiments, the end portions 128 and/or the peripheral edges 130 may be configured to influence mixing, flow characteristics, and/or directing of the lubricating fluid to generate flow turbulence. For example, the end portions 128 and/or the peripheral edges 130 may be sharpened, have notches, or have an irregularly shaped profile to at least partially agitate, break-up or create a desired flow characteristics in the lubricating fluid. In other embodiments, end portions 128 and/or the peripheral edges 130 may include divots to generate non-uniform flow in the lubricating fluid to at least partially agitate or break-up solids or solidifying materials in the lubricating fluid such that the potential for clogging the thrust-bearing assembly 100 is reduced.

The orientation of the mixing fins 118 relative to the support ring 102 may also be adapted to have any of a variety of configurations. For example, at least a portion of the mixing fin 118 may extend at an angle from an upper surface 102A of the support ring 102 toward the bearing surfaces 110 of the superhard bearing elements 108. Such a configuration may enhance flow of the lubricating fluid into and from stagnant flow areas between adjacent ones of the superhard bearing elements 108 (e.g., creating areas of high and low pressure during operation).

In other embodiments, at least a portion of the mixing fin 118 may be substantially normal to the upper surface of the ring 102. In yet other embodiments, at least a portion of the mixing fin 118 may be substantially parallel to the upper surface 102A of the support ring 102, with a height of the mixing fin 118 being substantially equal to a thickness of the mixing fin 118. The mixing fin 118 may have a height relative to the upper surface 102A of the support ring 102 that is less than a height of the bearing surfaces 110 relative to the upper surface 102A of the support ring 102 so that the mixing fins 118 do not intersect a common plane in which the bearing surfaces 110 substantially lie.

By varying the surfaces and/or the orientation of the mixing fins 118 relative to the upper surface 102A of the support ring 102, the mixing fins 118 may create desired flow characteristics in the lubricating fluid suitable to force the lubricating fluid toward the bearing surfaces 110 of the superhard bearing elements 108, mix the lubricating fluid to reduce clogging, help with efficient heat transfer from the support ring 102 and/or the superhard bearing elements 108 to the lubricating fluid, or combinations of the foregoing.

While the support ring 102 is shown including substantially identical mixing fins 118, in other embodiments, the support ring 102 may include mixing fins 118 of varying sizes and configurations. In other embodiments, the mixing fins 118 may be rotatably attached to the support ring 102 such that the mixing fins 118 may rotate relative to the support ring 102. Moreover, while the mixing fins 118 are illustrated being located on the support ring 102, in other embodiments, the mixing fins 118 may be attached to the superhard bearing elements 108 or other members of the thrust-bearing assembly 100. For example, the mixing fins 118 may be configured as projecting edges extending from at least a portion of each of the superhard bearing elements 108, such as the superhard table 114 and/or the substrate 116. Each projecting edge may include an upper surface oriented and/or configured to direct the lubricating fluid onto the bearing surfaces 110 and/or periphery of the superhard bearing elements 108. In other embodiments, the mixing fins 118 may be attached to or formed on a retention ring configured to secure the superhard bearing elements 108 between the support ring 102 and the retention ring. The retention ring may be similar to embodiments disclosed in co-pending application U.S. application Ser. No. 12/761,535, filed Apr. 16, 2010, entitled Bearing Assemblies, "Bearing Apparatuses Using the Same, and Related Methods", which is incorporated herein, in its entirety, by this reference.

Referring now to FIG. 1B, the mixing fins 118 may be circumferentially distributed about the thrust axis 112 such that the mixing fins 118 extend radially and are curved toward a rotational direction R of the support ring 102. When the support ring 102 rotates in the direction R, the mixing fins 118 may direct lubricating fluid flowing out from the center opening 104 of the support ring 102 onto the bearing surfaces 110 and/or periphery of the superhard bearing elements 108. In another embodiment, the mixing fins 118 may be distributed about the support ring 102 such that a portion of the peripheral edge 130 forms a leading edge that is curved toward the rotational direction R of the support ring 102. Such a configuration may force the lubricating fluid to flow across the leading edge portion of the peripheral edge 130 to agitate the lubricating fluid as it flows up onto the bearing surfaces 110 and/or the periphery of the superhard bearing elements 108. The leading edge portion of the peripheral edge 130 may include irregular notches configured to generate turbulence in the flow. In other embodiments, the superhard bearing elements 108 may be distributed about the support ring 102 such that a leading edge portion of one mixing fin 118 is oriented in a first rotational direction while a leading edge portion of adjacent mixing fins 118 are oriented in a generally opposite second rotational direction. Such a configuration may allow the mixing fins 118 to mix and/or direct the lubricating fluid onto the bearing surfaces 110 and/or periphery of the superhard elements 108 in both the first rotational direction, the second rotational direction, or both directions. Accordingly, wear on and damage of the superhard bearing elements 108 may be significantly reduced because of multi-directional lubrication and reduced clotting of the lubricating fluid.

In other embodiments, the superhard bearing elements 108 may also include ramped features and/or define converging channels between adjacent ones of the superhard bearing elements 108, both of which are configured to direct lubricating fluid onto the bearing surfaces 110 of the superhard bearing elements 108. The ramped features and/or converging channels may be the same or similar to embodiments disclosed in U.S. application Ser. No. 13/213,382, filed Aug. 19, 2011, entitled "Bearing Assemblies, Apparatuses, and Motor Assemblies Using the Same," which is incorporated herein, in its entirety, by this reference.

Figure 2A:
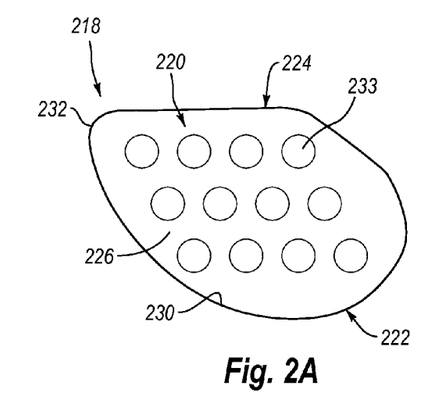
FIGS. 2A-2D are side views of mixing fins according to various embodiments.

FIGS. 2A-2D are side views of mixing fins according to other embodiments. Specifically, FIGS. 2A-2D illustrate side views of the mixing fins as if the mixing fins were substantially normal to an upper surface of a support ring (not shown). FIG. 2A illustrates a mixing fin 218 that may include a propeller blade like body 220 at least partially defined by an upper surface 224, a lateral surface 226, a lower surface 222, a peripheral edge 230, and a rounded tip 232. The lateral surface 226 of the mixing fin 218 may include a two-dimensional curve similar to a motor boat propeller to direct and lift the lubricating fluid onto the bearing surfaces 110 of the superhard bearing elements 108. In other embodiments, the lateral surface 226 may include perforations 233 extending therethrough to create pressure drops and localized flow velocities in the lubricating fluid to affect flow conditions. Moreover, as illustrated, the upper surface 224 and the lower surface 222 may include curved portions. In other embodiments, the body 220 may be sheet-like with the upper surface 224 and the lower surface 222 omitted. Rather, the lateral surface 226 may converge with a back lateral surface (not shown) at the peripheral edge 230 to form the body 220. In yet further embodiments, the peripheral edge 230 of the mixing fin 218 may include a leading edge and a trailing edge.

Figure 2B:
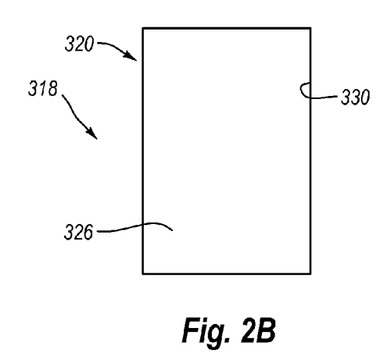

FIG. 2B illustrates a mixing fin 318 that may comprise a substantially rectangular plate 320 at least partially defined by a front lateral surface 326, a back lateral surface (not shown), and a peripheral edge 330 having pointed corners. The front lateral surface 326 and/or the back lateral surface may be substantially planar or may be curved, may include substantially planar and curved portions, or may include other configurations. In an embodiment, the mixing fin 318 may be oriented such that the front lateral surface 326 is generally perpendicular or tilted relative to the upper surface 102A of the support ring 102 (shown in FIG. 1A), with at least a portion of the peripheral edge 330 attached to and extending across the upper surface 102A of the ring 102 (shown in FIG. 1A). In such a configuration, the mixing fin 318 may create a flow obstruction between adjacent superhard bearing elements 108 such that the lubricating fluid is forced to flow over the top of the mixing fin 318 and onto the bearing surfaces 110 and/or the periphery of the superhard bearing elements 108.

Figure 2C:
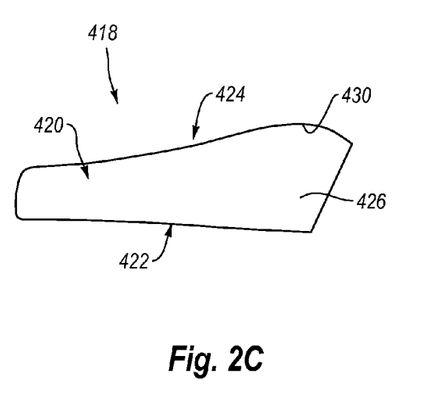

FIG. 2C illustrates a mixing fin 418 that may include a generally wing shaped body 420 that is at least partially defined by an upper surface 424, a lateral surface 426, a lower surface 422, and a peripheral edge 430. The upper surface 424 may include straight portions and curved portions and the lower surface 422 may include a straight portion. As illustrated, the lateral surface 426 may be defined at least partially between the lower surface 422 and the upper surface 424 with a width increasing from left to right. In an embodiment, the generally wing shaped body 420 may be configured to encourage lift and/or drag forces to turn or deflect the flow of the lubricating fluid onto the bearing surfaces 110 and/or the periphery of the superhard bearing elements 108.

Figure 2D:
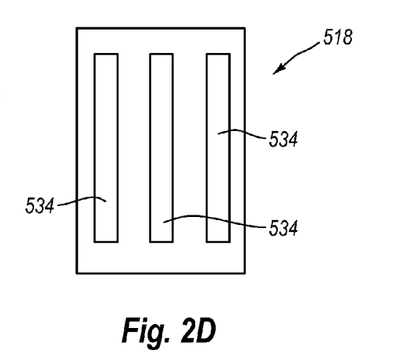

FIG. 2D illustrates a mixing fin 518 similar to the generally rectangular mixing fin 318 except that the mixing fin 518 may have portions of the mixing fin 518 removed to form slots 534 in the mixing fin 518. The configuration of the mixing fin 518 may allow some lubricating fluid to flow over and/or around the mixing fin 518 and some lubricating fluid to flow through the slots 534 of the mixing fin 518. The slots 534 may be configured to at least form pressure drops and/or to partially break-up any solids suspended in the lubricating fluid as the lubricating fluid flows through the slots 534 of the mixing fin 518. In addition, the slots 534 may also be configured to create turbulence in the lubricating fluid flowing over and/or through the mixing fin 518 by generating non-uniform flow patterns in the lubricating fluid.

Figure 3:
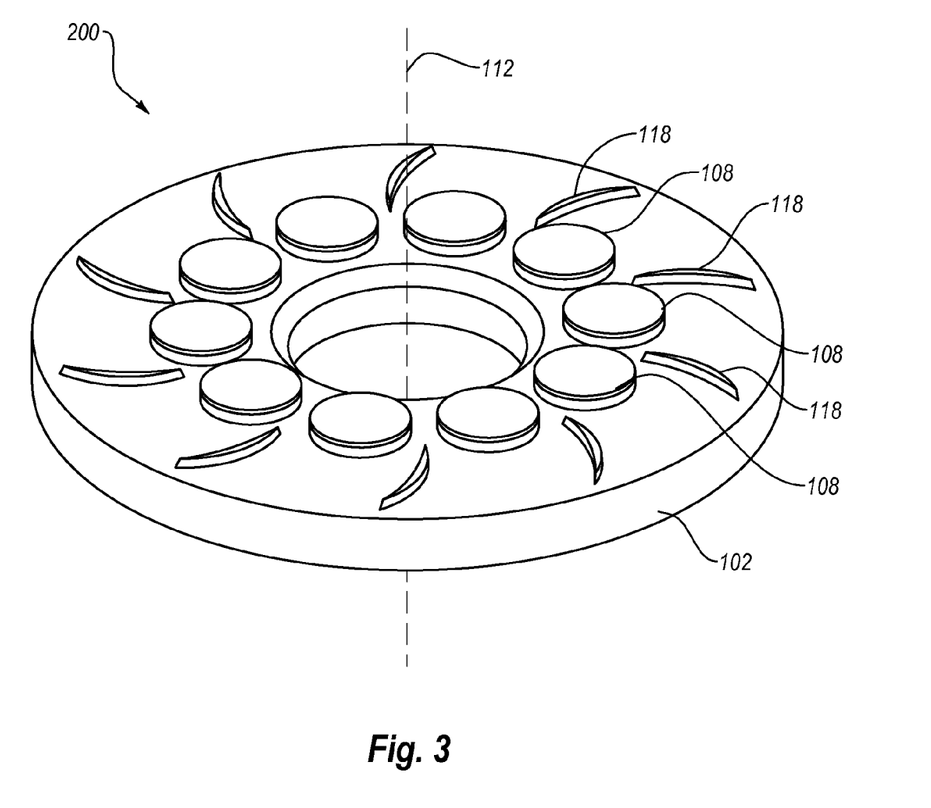
FIG. 3 is an isometric view of a thrust-bearing assembly according to an embodiment.

FIG. 3 is an isometric view of a thrust-bearing assembly 200 according to another embodiment. The thrust-bearing assembly 200 may be similar in many respects to thrust-bearing assembly 100, except that the mixing fins 118 may be positioned radially outside of the superhard bearing elements 108 rather between the superhard bearing elements 108 on the support ring 102. Specifically, the superhard bearing elements 108 may be circumferentially-distributed about the axis 112 generally on a first imaginary circle having a first radius and the mixing fins 118 may be circumferentially-distributed about the axis 112 generally on a second imaginary circle having a second radius larger than the first radius. In other embodiments, the mixing fins 118 may be positioned radially inside of the superhard bearing elements 108. For example, the superhard bearing elements 108 may be circumferentially-distributed about the axis 112 generally on the second imaginary circle having the second larger radius larger and the mixing fins 118 may be circumferentially-distributed about the axis 112 generally on the first imaginary circle having the smaller first radius. In yet other embodiments, one or more of the mixing fins 118 may be positioned radially inside of the superhard bearing elements 108 and one or more of the mixing fins 118 may be positioned radially outside of the superhard bearing elements 108.

In any of the thrust-bearing assemblies disclosed herein, the mixing fins 108 may project radially outward from an outer periphery of the support ring 102 as an alternative to or in addition to projecting from, for example, the upper surface 102A of the support ring 102. Such mixing fins may be attached to the periphery of the support ring 102 and/or may be integrally formed with the support ring 102. Mixing fins that project radially outward from a periphery of the support ring 102 may also create desired flow characteristics in the lubricating fluid suitable to force the lubricating fluid toward the bearing surfaces 110 of the superhard bearing elements 108, mix the lubricating fluid to reduce clogging, help with efficient heat transfer from the support ring 102 and/or the superhard bearing elements 108 to the lubricating fluid, or combinations of the foregoing.

Figure 4:
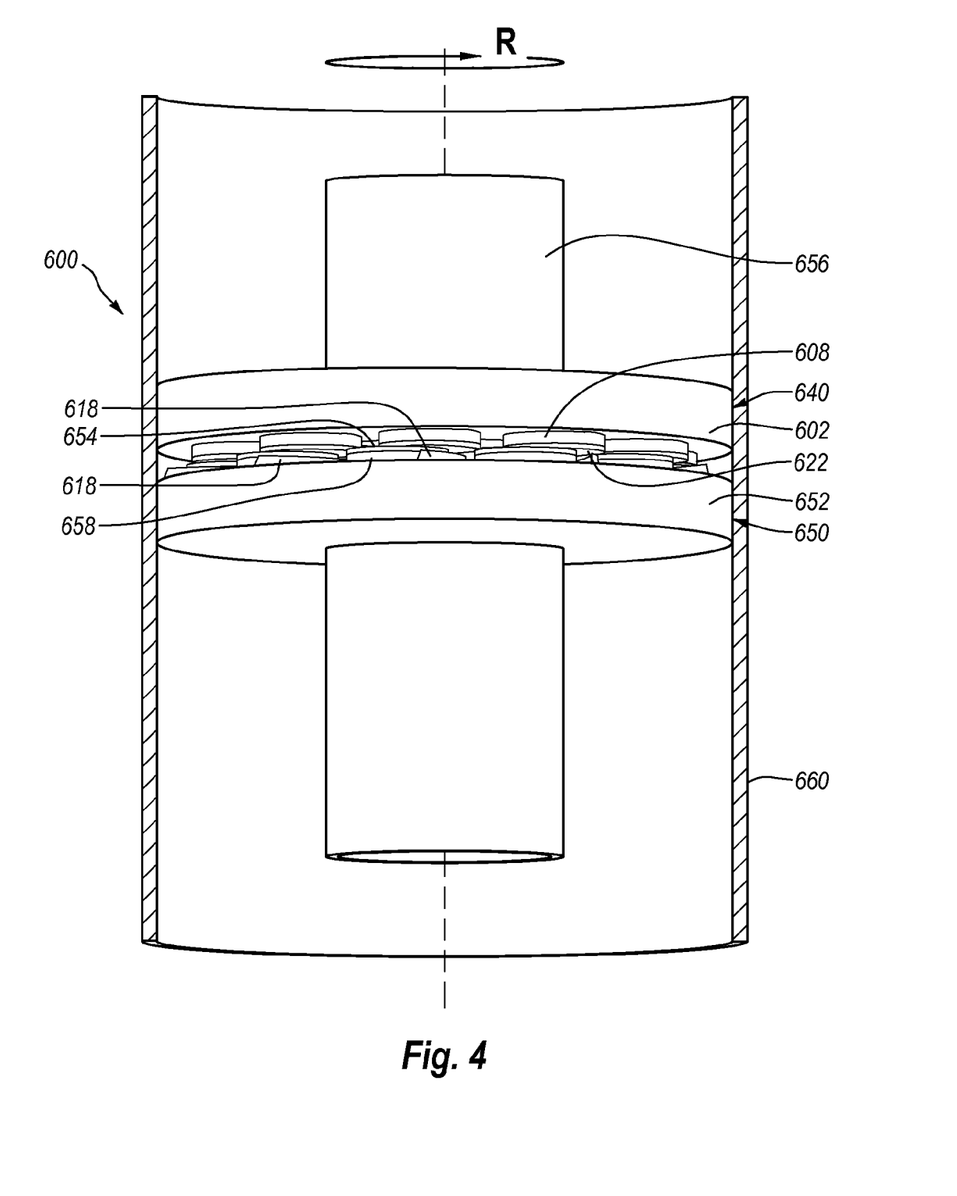
FIG. 4 is an isometric view of a thrust-bearing apparatus that may employ any of the disclosed thrust-bearing assemblies according to an embodiment, with the housing shown in cross-section.

Any of the above-described thrust-bearing assembly embodiments may be employed in a thrust-bearing apparatus. FIG. 4 is an isometric view of a thrust-bearing apparatus 600. The thrust-bearing apparatus 600 may include a stator 640. The stator 640 may include a plurality of circumferentially-adjacent superhard bearing elements 608, with each of the superhard bearing elements 608 having a bearing surface 622. The thrust-bearing apparatus 600 further may include a rotor 650. The rotor 650 may include a support ring 652 and a plurality of superhard bearing elements 658 mounted or otherwise attached to the support ring 652, with each of the superhard bearing elements 658 having a bearing surface 654. At least a portion of the rotor 650 may include at least one mixing fin 618 that may exhibit, for example, the configuration of the mixing fins 118 or any other mixing fin disclosed herein. The mixing fins 618 may be mounted or otherwise attached to a support ring 652. As shown, a shaft 656 may be coupled to the support ring 652 and operably coupled to an apparatus capable of rotating the shaft 656 in a direction R (or in a generally opposite direction), such as a downhole motor. For example, the shaft 656 may extend through and may be secured to the support ring 652 of the rotor 650 by press-fitting or threadly coupling the shaft 656 to the support ring 652 or another suitable technique. A housing 660 may be secured to a support ring 602 of the stator 640 and may extend circumferentially about the shaft 656 and the rotor 650.

In operation, the lubricating fluid, which may include, lubricating fluid, drilling fluid, or mud may be pumped between the shaft 656 and the housing 660, and between the superhard bearing elements 658 of the rotor 650. The mixing fins 618 of the rotor 650 may help direct and/or lift the lubricating fluid between the bearing surfaces of the stator 640 and the bearing surfaces 654 of the rotor 650 which in turn can greatly reduce friction and heat generated between the bearing surfaces 622 of the stator 640 and the bearing surfaces 654 of the rotor 650. Moreover, the mixing fins 618 of the rotor 650 may include sharpened edges or slots to help break-up any solids or solidifying materials in the lubricating fluid. Such a configuration may help prevent the bearing apparatus 600 from clogging up. In addition, the mixing fins 618 may be include helical surfaces to help circulate the lubricating fluid through the thrust-bearing apparatus 600 (e.g., by creating areas of high and low pressure during operation).

Under certain operational conditions the thrust-bearing apparatus 600 may be operated as a hydrodynamic bearing. For example, where the rotational speed of the rotor 650 is sufficiently great and the thrust load is sufficiently low, a fluid film may develop between the bearing surfaces 622 of the stator 640 and the bearing surfaces 654 of the rotor 650. The mixing fins 618 on the rotor 650 may help develop and/or maintain the fluid film by directing the lubricating fluid toward the bearing surfaces. The fluid film can have sufficient pressure to prevent contact between the respective bearing surfaces and, thus, substantially reduce wear of the superhard bearing elements 658 and the superhard bearing elements 608. In such a situation, the thrust-bearing apparatus 600 may be described as operating hydrodynamically. When the thrust loads exceed a certain value and/or the rotational speed of the rotor 650 is reduced, the pressure of the fluid film may not be sufficient to prevent the bearing surfaces of the stator 640 and the bearing surfaces of the rotor 650 from contacting each other. Thus, the thrust-bearing apparatus 600 may be operated to significantly improve lubrication of the contact area between the bearing surfaces of the stator 640 and the bearing surfaces of the rotor 650 or as a hydrodynamic bearing.

It is noted that in other embodiments, the rotor or stator may be configured as any of the previously described embodiments of thrust-bearing assemblies.

The concepts used in the thrust-bearing assemblies and apparatuses described above may also be employed in the radial bearing assemblies and apparatuses.

Figure 5:
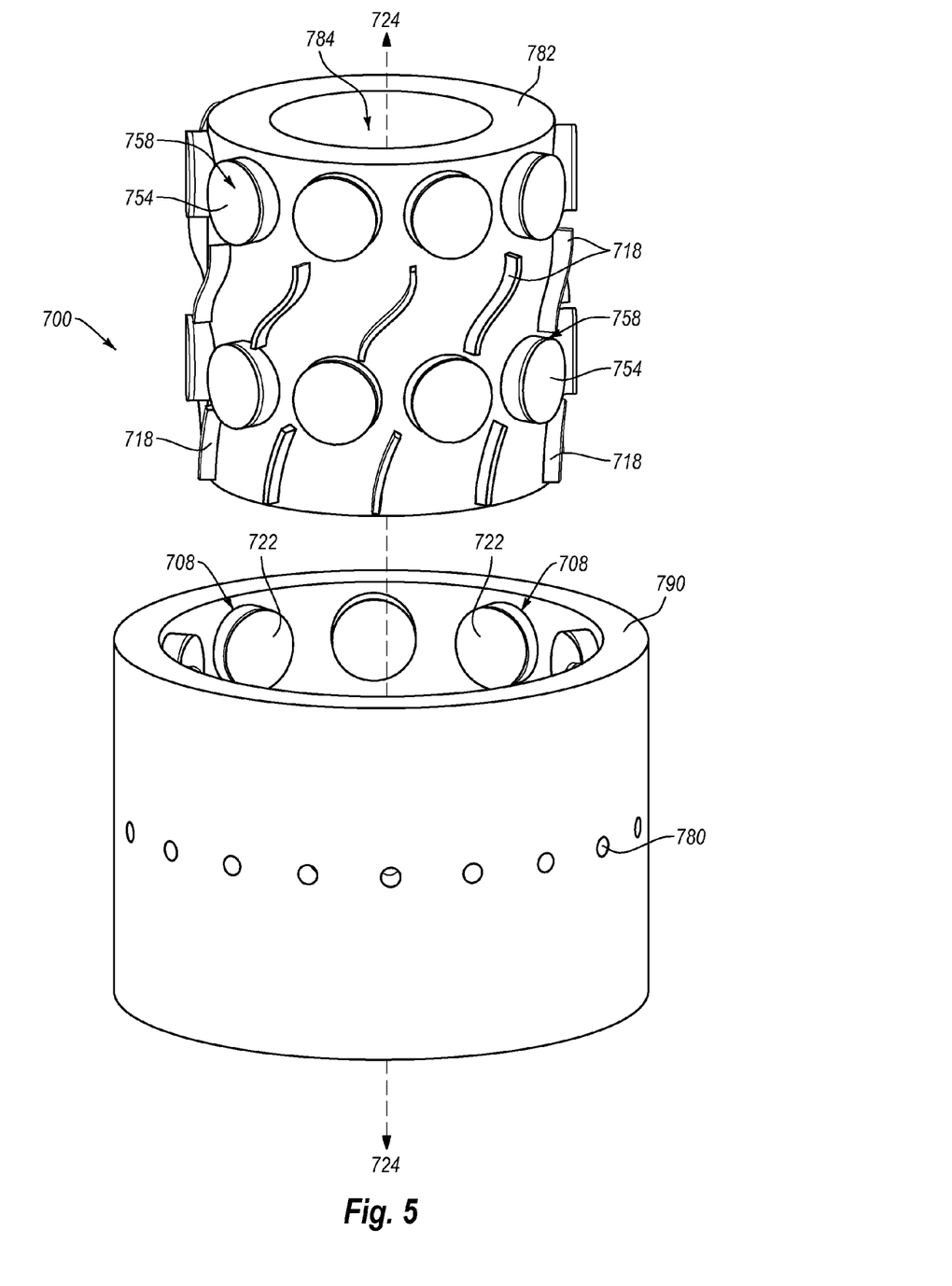
FIG. 5 is an exploded isometric view of a radial bearing assembly according to an embodiment.

FIG. 5 is an exploded isometric view of a radial bearing apparatus 700 according to another embodiment. The radial bearing apparatus 700 may include an inner race 782 (i.e., a rotor). The inner race 782 may define an opening 784 and may include a plurality of circumferentially-adjacent superhard bearing elements 758, each of which includes a convexly-curved bearing surface 754. The superhard bearing elements 758 may be distributed circumferentially about a rotation axis 724 in corresponding recesses (not shown) formed in the inner race 782 and arranged in a first row and a second row. The radial bearing apparatus 700 may further include an outer race 790 (i.e., a stator) that extends about and receives the inner race 782. The outer race 790 may include a plurality of circumferentially-distributed superhard bearing elements 708, each of which includes a concavely-curved bearing surface 722 curved to correspond to the convexly-curved bearing surfaces 754. The superhard bearing elements 708 and 758 may each be made from any of the materials discussed above for the superhard bearing elements 108. The outer race 790 may also include a plurality of fluid conduits 780 through which lubricating/drilling fluid may enter or exit the radial bearing apparatus 700. The terms "rotor" and "stator" refer to rotating and stationary components of the radial bearing apparatus 700, respectively. Thus, if the outer race 790 is configured to remain stationary, the outer race 790 may be referred to as the stator and the inner race 782 may be referred to as the rotor.

The inner race 782 may also include a plurality of mixing fins 718 arranged in a first row and a second row. The first row of mixing fins is illustrated above the second row of superhard bearing elements 758 and the second row of mixing fins 718 is illustrated below the second row of superhard bearing elements 758. The mixing fins 718 may have varying configurations and/or shapes. For example, the first row of mixing fins 718 are illustrated having generally s-shaped bodies while the second row of mixing fins 718 are illustrated having arcuate shaped bodies. Depending on anticipated flow conditions at specific locations within the radial bearing apparatus 700, appropriate configurations of the mixing fin 718 may be selected. For example, the mixing fins 718 may be configured to direct flow in one or more selected directions (e.g., up and out). In another embodiment, the mixing fins 718 may be configured to direct flow in three directions (i.e., up, down, and out).

The multi-row arrangement of the mixing fins 718 may allow the mixing fins 718 to direct the lubricating fluid flowing through the radial bearing apparatus 700 onto the bearing surfaces 754 in either or both the illustrated first and second rows of superhard bearing elements 758. As shown, the mixing fins 718 may be positioned such that the mixing fins 718 are angled relative to the bearing surfaces 754 of the superhard bearing elements 758 to direct the lubricating fluid at the first and/or second row of the superhard bearing elements 758. In addition, at least a portion of the mixing fins 718 may include curved surfaces such that turbulent flow can be encouraged to mix the lubricating fluid. Mixing the lubricating fluid may help prevent solids suspended in the lubricating fluid from clogging up the radial bearing apparatus 700. Further, under certain operating conditions the mixing fins 718 may help direct lubricating fluid onto the bearing surfaces 722 and the bearing surfaces 754 to form a fluid film.

The radial bearing apparatus 700 may be employed in a variety of mechanical applications. For example, so-called "rotary cone" rotary drill bits, pumps, or turbines may benefit from a radial bearing apparatus disclosed herein, or rotary steerable drilling systems.

It is noted that the outer race 790 of the radial bearing apparatus 700 is shown not including mixing fins 718. However, in other embodiments, the outer race may include a plurality of mixing fins configured to help direct lubricating fluid onto the bearing surfaces of the outer race and/or inner race during operation. In other embodiments, either the inner race or the outer race may include fluid conduits.

In operation, rotation of the shaft sections (not shown) secured to the rotor 782 may effect rotation of the rotor 782 relative to the stator 790. Drilling fluid or other lubricant may be pumped through fluid conduits 780 of the stator 790 between the bearing surfaces 754 of the rotor 782. The mixing fins 718 on the rotor 782 may help direct lubricating fluid between the bearing surface 754 of the superhard bearing elements 758 and the bearing surfaces 722 of the superhard bearing elements 708 by forcing the lubricating fluid toward the bearing surfaces. Moreover, under certain operational conditions and at sufficient rotational speeds for the rotor 782, a fluid film may develop between the bearing surface 754 of the superhard bearing elements 758 and the bearing surfaces 722 of the superhard bearing elements 708 having sufficient pressure to maintain the bearing surfaces 754 and the bearing surfaces 722 apart from each other. Accordingly, wear on the superhard bearing elements 708 and the superhard bearing elements 758 may be reduced. In addition, the mixing of the lubricating fluid may help extend the life of the radial bearing apparatus 700 by reducing clogging of the lubricating material between the stator 782 and the rotor 790.

Figure 6:
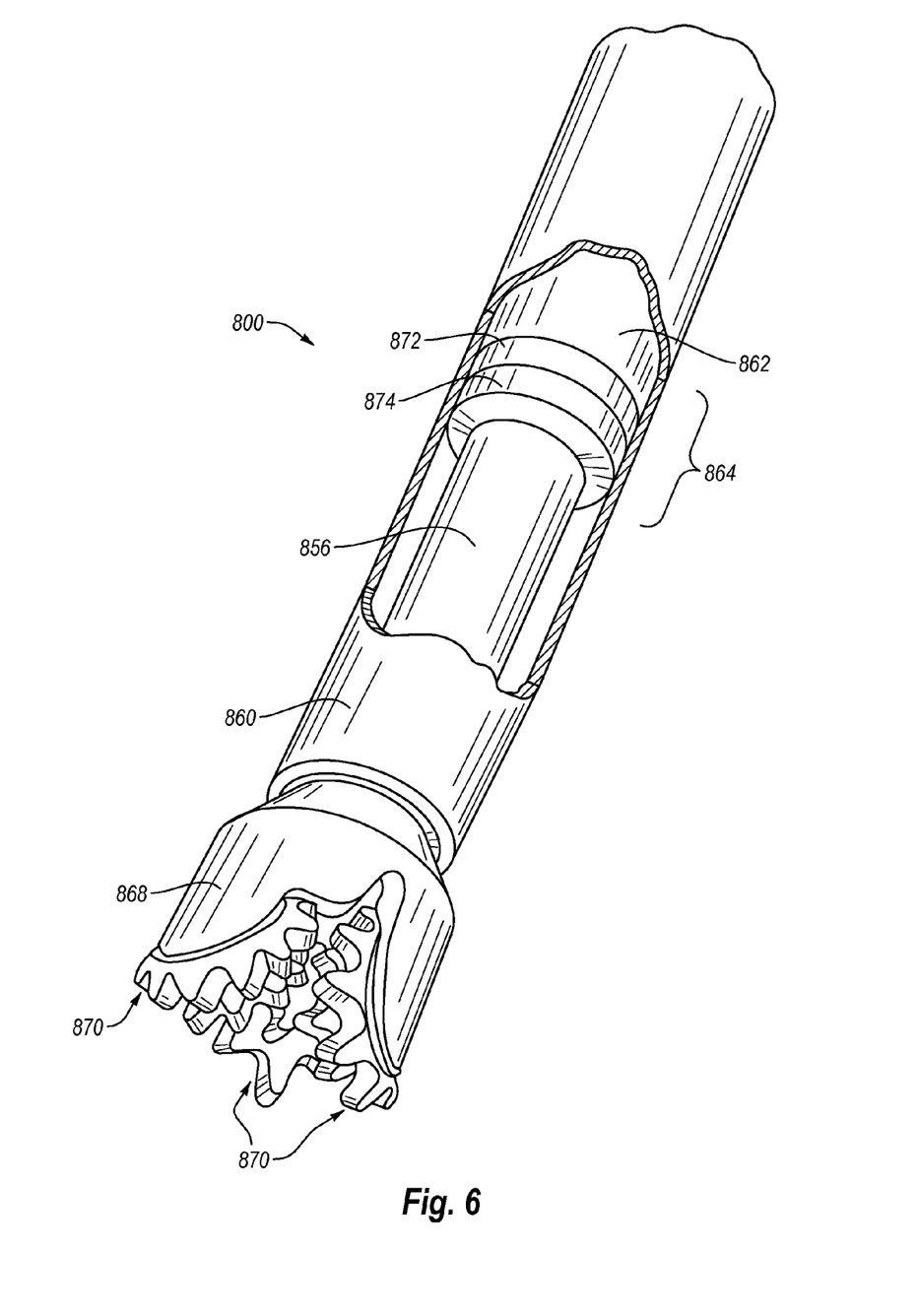
FIG. 6 is a schematic isometric cutaway view of a subterranean drilling system including a thrust-bearing apparatus utilizing any of the previously described bearing assemblies according to various embodiments.

Any of the embodiments for bearing apparatuses discussed above may be used in a subterranean drilling system. FIG. 6 is a schematic isometric cutaway view of a subterranean drilling system 800 according to an embodiment. The subterranean drilling system 800 may include a housing 860 enclosing a downhole drilling motor 862 (i.e., a motor, turbine, or any other device capable of rotating an output shaft) that may be operably connected to an output shaft 856. A thrust-bearing apparatus 864 may be operably coupled to the downhole drilling motor 862. The thrust-bearing apparatus 864 may be configured as any of the previously described thrust-bearing apparatus embodiments. A rotary drill bit 868 may be configured to engage a subterranean formation and drill a borehole and may be connected to the output shaft 856. The rotary drill bit 868 is shown as a roller cone bit including a plurality of roller cones 870. However, other embodiments may utilize different types of rotary drill bits, such as so-called "fixed cutter" drill bits. As the borehole is drilled, pipe sections may be connected to the subterranean drilling system 800 to form a drill string capable of progressively drilling the borehole to a greater depth within the earth.

The thrust-bearing apparatus 864 may include a stator 872 that does not rotate and a rotor 874 that may be attached to the output shaft 856 and rotates with the output shaft 856. As discussed above, the thrust-bearing apparatus 864 may be configured as any of the embodiments disclosed herein. For example, the stator 872 may include a plurality of circumferentially-distributed superhard bearing elements (not shown) similar to those shown and described in the thrust-bearing assembly 100 of FIG. 1A. The rotor 874 may include a plurality of circumferentially-distributed superhard bearing elements (not shown) and mixing fins (not shown) such as those shown and described in the thrust-bearing assembly 100 of FIG. 1A.

In operation, lubricating fluid may be circulated through the downhole drilling motor 862 to generate torque and effect rotation of the output shaft 856 and the rotary drill bit 868 attached thereto so that a borehole may be drilled. A portion of the lubricating fluid may also be used to lubricate opposing bearing surfaces of the stator 872 and the rotor 874. When the rotor 874 is rotated, the mixing fins of the rotor 874 may direct the lubricating fluid onto the bearing surfaces of the stator 872 and the rotor 874, as previously discussed.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing assembly, comprising:
    a plurality of superhard bearing elements distributed circumferentially about an axis, each of the plurality of superhard bearing elements having a bearing surface;
    a support ring that carries the plurality of superhard bearing elements; and
    a plurality of mixing features separate from the plurality of superhard bearing elements and distributed circumferentially about the axis, the plurality of mixing features being configured and arranged to at least partially influence flow of lubricating fluid onto the bearing surfaces and/or a periphery of at least some of the plurality of superhard bearing elements during operation of the bearing assembly, each of the plurality of mixing features extending above the support ring, each of the plurality of mixing features including an elongated body having an upper surface located below each of the bearing surfaces of the plurality of superhard bearing elements, each of the plurality of mixing features exhibiting a longest dimension oriented substantially in a radial or an axial direction.

2. The bearing assembly of claim 1 wherein the plurality of mixing features are further configured to reduce clogging of the bearing assembly.

3. The bearing assembly of claim 1 wherein the plurality of mixing features are further configured to at least partially pump the lubricating fluid in one or more selected directions.

4. The bearing assembly of claim 1 wherein the elongated body of at least one of the plurality of mixing features includes a two-dimensional curved surface configured to alter the flow of the lubricating fluid.

5. The bearing assembly of claim 1 wherein the elongated body of at least one of the plurality of mixing features has a substantially crescent shaped body.

6. The bearing assembly of claim 1 wherein the elongated body of at least one of the plurality of mixing features includes raised features, depressed features, or combinations thereof to influence flow of the lubricating fluid.

7. The bearing assembly of claim 1 wherein the elongated body of at least one of the plurality of mixing features includes a surface that is flat, curved, or combinations thereof.

8. The bearing assembly of claim 1 wherein the elongated body of at least one of the plurality of mixing features comprises at least one lateral surface that extends at a predetermined angle relative to an upper surface of the support ring.

9. The bearing assembly of claim 1 wherein the elongated body of at least one of the plurality of mixing features comprises at least one lateral surface that is substantially perpendicular to an upper surface of the support ring.

10. The bearing assembly of claim 1 wherein the upper surface of the elongated body of at least one of the plurality of mixing features is substantially parallel to an upper surface of the support ring.

11. The bearing assembly of claim 1 wherein the plurality of mixing features are formed integrally with the support ring.

12. The bearing assembly of claim 1 wherein the plurality of mixing features are brazed, interference-fitted, or fastened to the upper surface of the support ring.

13. The bearing assembly of claim 1 wherein at least one of the plurality of mixing features is positioned between adjacent ones of the plurality of superhard bearing elements.

14. The bearing assembly of claim 1 wherein the plurality of mixing features are distributed about the axis in a plurality of rows.

15. The bearing assembly of claim 1 wherein at least some of the superhard bearing elements include a chamfered edge.

16. The bearing assembly of claim 1 wherein each of at least some of the plurality of superhard bearing elements comprises a substrate and a polycrystalline diamond table bonded to the substrate.

17. The bearing assembly of claim 1 wherein each of the bearing surfaces comprises concavely-curved bearing surfaces or convexly-curved bearing surfaces.

18. The bearing assembly of claim 1 wherein the axis is a thrust axis, and wherein the support ring and the plurality of superhard bearing elements define a thrust-bearing assembly.

19. The bearing assembly of claim 1 wherein the axis is a rotation axis, and wherein the support ring and the plurality of superhard bearing elements define a radial bearing assembly.

20. The bearing assembly of claim 1 wherein the plurality of the superhard bearing elements are brazed, interference-fitted, or fastened to the support ring.

21. A bearing apparatus, comprising:

a first bearing assembly including:

a first plurality of superhard bearing elements distributed circumferentially about an axis, each of the first plurality of superhard bearing elements having a bearing surface;

a first support ring having an upper surface that carries the first plurality of superhard bearing elements; and a first plurality of mixing features separate from the first plurality of superhard bearing elements and distributed circumferentially about the axis, the first plurality of mixing features having two-dimensional flow surfaces configured to at least partially influence flow of lubricating fluid over the bearing surfaces and/or a periphery of at least some of the first plurality of superhard bearing elements, each of the first plurality of mixing features extending above the first support ring, each of the first plurality of mixing features including an elongated body having an upper surface located below each of the bearing surfaces of the first plurality of superhard bearing elements, each of the first plurality of mixing features exhibiting a longest dimension oriented substantially in a radial or an axial direction; and a second bearing assembly including;

a second plurality of superhard bearing elements substantially opposed to the first plurality of superhard bearing elements of the first bearing assembly; and a second support ring that carries the second plurality of superhard bearing elements.

22. The bearing apparatus of claim 21 wherein the first bearing assembly is configured as a rotor, and the second bearing assembly is configured as a stator.

23. The bearing apparatus of claim 21 wherein the second bearing assembly includes a second plurality of mixing features.

* * * * *